US009135939B2

United States Patent
Nakae (10) Patent No.: US 9,135,939 B2
(45) Date of Patent: Sep. 15, 2015

(54) GLASS SUBSTRATE FOR INFORMATION RECORDING MEDIUM, INFORMATION RECORDING MEDIUM AND METHOD OF MANUFACTURING GLASS SUBSTRATE FOR INFORMATION RECORDING MEDIUM

(75) Inventor: Hazuki Nakae, Kyoto (JP)

(73) Assignee: HOYA CORPORATION, Tokyo (JP)

( * ) Notice: Subject to any disclaimer, the term of this patent is extended or adjusted under 35 U.S.C. 154(b) by 4 days.

(21) Appl. No.: 13/496,425

(22) PCT Filed: Sep. 3, 2010

(86) PCT No.: PCT/JP2010/065114
§ 371 (c)(1),
(2), (4) Date: Mar. 15, 2012

(87) PCT Pub. No.: WO2011/033948
PCT Pub. Date: Mar. 24, 2011

(65) Prior Publication Data
US 2012/0177949 A1 Jul. 12, 2012

(30) Foreign Application Priority Data
Sep. 18, 2009 (JP) ................................. 2009-216360

(51) Int. Cl.
*G11B 5/73* (2006.01)
*G11B 5/735* (2006.01)

(52) U.S. Cl.
CPC .............. *G11B 5/7315* (2013.01); *G11B 5/735* (2013.01); *G11B 2220/2516* (2013.01); *Y10T 428/24355* (2015.01)

(58) Field of Classification Search
CPC ........ B82Y 30/00; B82Y 40/00; B82Y 20/00; G11B 5/855; G11B 27/36; G11B 5/746; G11B 20/1217; G11B 20/182; G11B 27/322; G11B 5/3113; G11B 5/3163; G11B 5/5521; G11B 5/59633; G11B 5/59638; G11B 5/7315; G11B 5/735; G11B 2220/2516
USPC .......... 65/22; 428/65.3, 836, 141, 846.9, 848; 360/135, 31; 261/91; 451/41
See application file for complete search history.

(56) References Cited

U.S. PATENT DOCUMENTS

2001/0007723 A1   7/2001   Tokumoto
(Continued)

FOREIGN PATENT DOCUMENTS

| JP | 2000-207733 | | 7/2000 | |
| JP | 2001-084573 | * | 3/2001 | ............... G11B 5/82 |
| JP | 2001-240420 A | | 9/2001 | |
| JP | 2001-344732 | | 12/2001 | |

(Continued)

OTHER PUBLICATIONS

Machine translation: Fuji (JP 2001-084573), Mar. 30, 2001.*

*Primary Examiner* — Kevin M. Bernatz
(74) *Attorney, Agent, or Firm* — Brinks Gilson & Lione (57) ABSTRACT

For the purpose of providing a glass substrate for an information recording medium capable of acquiring a low GA value, provided is the glass substrate for an information recording medium, wherein a surface of the glass substrate has an arithmetic mean undulation Wa of less than 0.6 nm, and a fine undulation having a root-mean-square height Rq of less than 0.01 nm at a measurement wavelength of 80-120μm in a radial direction.

3 Claims, 4 Drawing Sheets

(56) References Cited

U.S. PATENT DOCUMENTS

2003/0037569 A1* 2/2003 Arbab et al. .................. 65/22
2003/0113506 A1* 6/2003 Takahashi et al. ........... 428/65.3
2006/0000809 A1* 1/2006 Matsumoto .................... 216/91
2009/0161242 A1* 6/2009 Aida et al. ..................... 360/31
2010/0273030 A1* 10/2010 Kitsunai et al. .............. 428/848

FOREIGN PATENT DOCUMENTS

| JP | 2003-173517 | 6/2003 |
| JP | 2004-253058 | 9/2004 |
| JP | 2006-351081 A | 12/2006 |
| JP | 2007-164916 | 6/2007 |
| WO | WO 2009/084534 | 7/2009 |

* cited by examiner

GLASS SUBSTRATE FOR INFORMATION RECORDING MEDIUM, INFORMATION RECORDING MEDIUM AND METHOD OF MANUFACTURING GLASS SUBSTRATE FOR INFORMATION RECORDING MEDIUM

This is a U.S. National Phase Application under 35 USC 371 of International Application PCT/JP2010/065114 filed on Sep. 3, 2010.

This application claims the priority of JP 2009-216360 filed Sep. 18, 2009, the entire content of which is hereby incorporated by reference.

TECHNICAL FIELD

The present invention relates to a glass substrate for an information recording medium, the information recording medium and a method of manufacturing the glass substrate for the information recording medium.

BACKGROUND

Aluminum substrates have been widely utilized as substrates for a magnetic recording medium such as a magnetic disk or the like as an information recording medium, but along with high density recording together with downsizing of the magnetic disk, the aluminum substrates tend to be replaced by glass substrates each exhibiting excellent strength and excellent recording surface flatness, compared with the aluminum substrates.

In recent years, reduction of flying height of a magnetic head (glide•height) has been demanded in order to improve the recording density, and to respond to this demand, the surface of a magnetic recording medium, that is, the surface of a glass substrate for a magnetic recording medium is desired to be finished as an extremely uniform surface.

In Patent Document 1, disclosed is a magnetic disk with a fine undulation having a period of 0.1-5 mm, and an amplitude of 0.1-1 nm.

In Patent Document 2, disclosed is a magnetic disk for which the undulation on the surface when measuring at a measurement wavelength of 5.0 mm has an amplitude Wa of 0.1-0.5 nm; the fine undulation formed on the foregoing undulation when measuring at a measurement wavelength of 30-200 μm has a mean amplitude Wb of 0.3 nm or less; and a value Wb/Wa obtained by dividing mean amplitude of the fine undulation Wb with amplitude of the undulation Wa is 0.6 or more.

Flying height of a magnetic head is often indicated by a Glide Avalanche value (GA value) via evaluation of the flying height of the magnetic head (for example, Patent Document 3). A magnetic recording medium becomes suitable for high recording density when the GA value becomes smaller.

PRIOR ART DOCUMENT

Patent Document

Patent Document 1: Japanese Patent O.P.I. (Open to Public Inspection) Publication No. 2000-207733

Patent Document 2: Japanese Patent O.P.I. Publication No. 2007-164916

Patent Document 3: Japanese Patent O.P.I. Publication No. 2003-173517

DISCLOSURE OF THE INVENTION

Problems to be Solved by the Invention

However, a desired low GA value is not obtained even in the case satisfying the condition where the profile of a magnetic disk or a magnetic disk substrate described is specified in Patent Document 1 and Patent Document 2.

The present invention has been made on the basis of the above-described problem, and it is an object of the present invention to provide a glass substrate for an information recording medium capable of acquiring a low GA value, an information recording medium in which the glass substrate for the information recording medium, and a method of manufacturing the glass substrate for the information recording medium.

Means to Solve the Problems

The above-described problem can be solved by the following structures.

(Structure 1) A glass substrate for an information recording medium, wherein a surface of the glass substrate has an arithmetic mean undulation Wa of less than 0.6 nm at a measurement wavelength of 0.1-5 mm, and a fine undulation having a root-mean-square height Rq of less than 0.01 nm at a measurement wavelength of 80-120 μm in a radial direction.

(Structure 2) The glass substrate of Structure 1, wherein the arithmetic mean undulation Wa is less than 0.55 nm, and the fine undulation has a root-mean-square height Rq of less than 0.007 nm.

(Structure 3) An information recording medium comprising a magnetic film provided on the glass substrate of Structure 1 or 2.

(Structure 4) A method of manufacturing a glass substrate for an information recording medium, comprising the step of polishing at not more than 600 kg/m2 as a load applied to the glass substrate from a platen of a polishing machine and at not more than 10 rpm as the number of rotations of the platen, wherein a surface of the glass substrate after the foregoing polishing step has an arithmetic mean undulation Wa of less than 0.6 nm at a measurement wavelength of 0.1-5 mm, and a fine undulation having a root-mean-square height Rq of less than 0.01 nm at a measurement wavelength of 80-120 μm in a radial direction.

(Structure 5) The method of Structure 4, wherein the arithmetic mean undulation Wa is less than 0.55 nm, and the fine undulation has a root-mean-square height Rq of less than 0.007 nm.

EFFECT OF THE INVENTION

In the present invention, provided can be a glass substrate for an information recording medium capable of acquiring a low GA value, an information recording medium in which the glass substrate for the information recording medium, and a method of manufacturing the glass substrate for the information recording medium.

BRIEF DESCRIPTION OF THE DRAWINGS

FIGS. 3a and 3b each are an enlarged cross-sectional view of a glass substrate, and FIG. 3a shows an undulation and a fine undulation of the surface of a glass substrate and FIG. 3b shows the fine undulation approximately in one period, obtained by enlarging a part of the undulation.

FIGS. 4a and 4b each are a diagram schematically showing a surface profile of a magnetic disk and movement trajectory of a head, and FIG. 4a shows the case where measurement length L1 of a fine undulation exceeds 120 μm and FIG. 4b shows the case where measurement length L2 of a fine undulation is less than 80 μm.

DESCRIPTION OF THE PREFERRED EMBODIMENTS

The present invention will be explained on the basis of embodiments, but the present invention is not limited to the embodiments.

Figure 1:
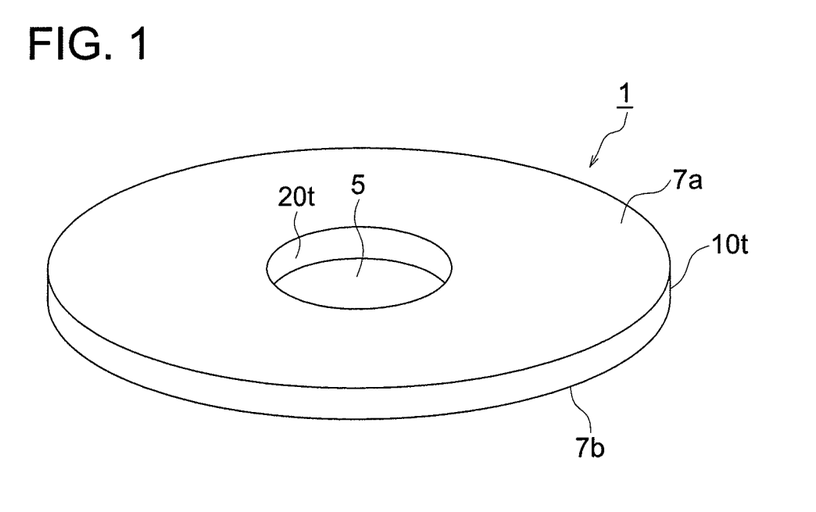
FIG. 1 is a diagram showing a glass substrate for an information recording medium as a whole.
Figure 2:
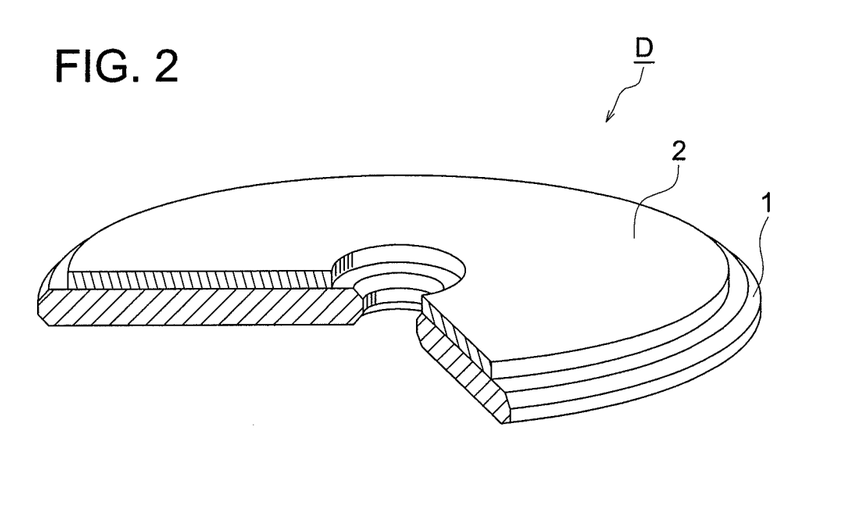
FIG. 2 is a diagram showing an example of a magnetic recording medium in which a magnetic film is provided on a front main surface of a glass substrate for an information recording medium.

FIG. 1 shows the entire structure of glass substrate 1 for an information recording medium (hereinafter, referred to also as glass substrate 1) as a substrate in a magnetic disk for an information recording medium of the present invention. As shown in FIG. 1, glass substrate 1 is in the form of a torus-shaped disk of which hole 5 is formed in the center. Symbols 10t, 20t, 7a and 7b represent an outer circumferential edge face, an inner circumferential edge face, a front main surface and a back main surface, respectively. Further, FIG. 2 is a diagram showing an example of a magnetic recording medium (referred to also as magnetic disk D) in which magnetic film 2 is provided on front main surface 7a of glass substrate 1 as shown in FIG. 1. Magnetic disk 2 can be also provided on back main surface 7b.

Figure 3A:
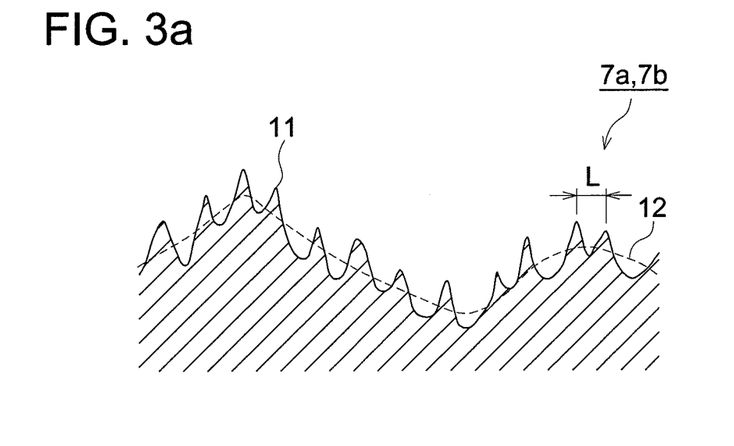
Figure 3B:
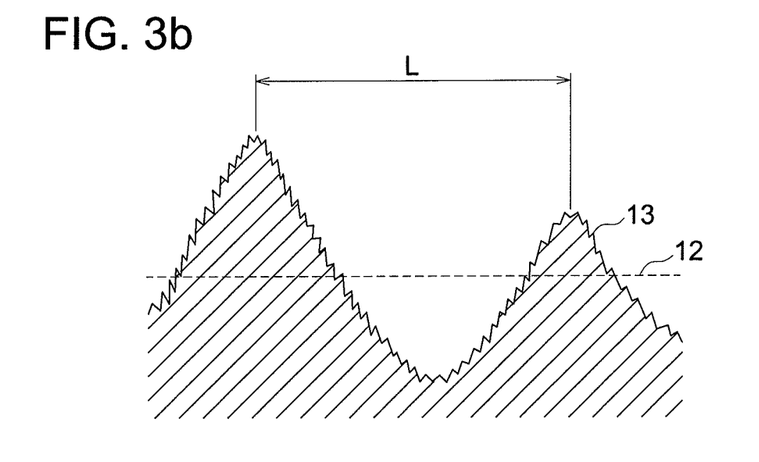

An enlarged cross-sectional view of a glass substrate is shown in each of FIGS. 3a and 3b. A solid line in FIG. 3a is measuring cross-sectional curve 11 showing a surface profile of a glass substrate. Further, a dashed line is undulation curve 12 representing undulation of the surface of a glass substrate. FIG. 3b is a diagram in which a part of FIG. 3a is enlarged, showing fine undulation curve 13 as a roughness curve generated in undulation curve 12, and L represents a measurement wavelength.

In HDD (Hard Disk Drive), information is magnetically read and written by a head when a head is moving on a magnetic disk. In order to make the magnetic disk to respond to high recording density, information should be recorded and reproduced by the heads at low head-flying height. As to a test of the magnetic disk, measurement of a glide avalanche value (GA value) is provided as a method of evaluating the head-flying height.

The GA value in the present embodiment means head-flying height at a time when the head-flying height is gradually lowered, and has become unstable on a magnetic disk for tests. The smaller the GA value, the smaller the head-flying height with respect to a magnetic disk can be, and this is applicable to high recording density.

It has appeared so far that the GA value is influenced by fine undulation of the entire magnetic disk, but after considerable effort during intensive studies concerning how the GA value can be minimized, the inventor has found out that the fine undulation in the radial direction of a magnetic disk largely influences the GA value. Assuming that the fine undulation observed from the radial direction, closer to movement of a head, may influence the GA value more significantly, the inventor has achieved the present invention by focusing on the fine undulation in the radial direction of the magnetic disk.

Further, it was understood that the relationship between the GA value and the fine undulation was noticeable when measurement wavelength L of fine undulation was limited to a range of 80-120 μm. Specifically, when a value Rq obtained by determining height of the fine undulation in the radial direction with root-mean-square (hereinafter, referred to also as root-mean-square height Rq) at a measurement wavelength L of 80-120 μm was set to less than 0.01 nm, and was preferably set to less than 0.007 nm, it was to be understood that sufficiently low GA values was practically obtained.

Figure 4A:
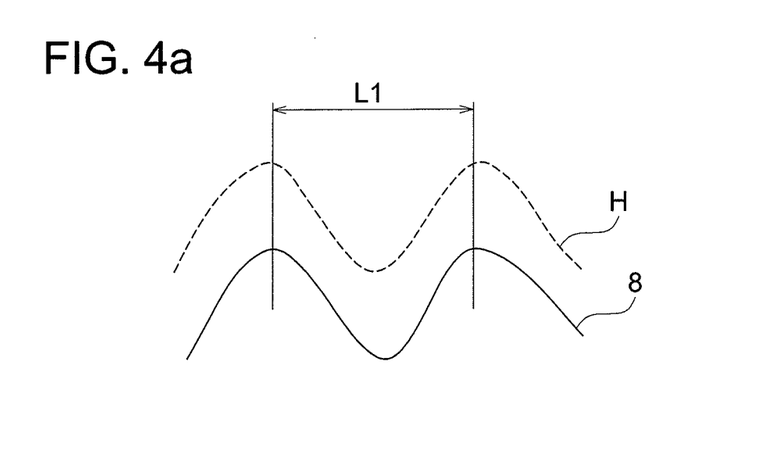
Figure 4B:
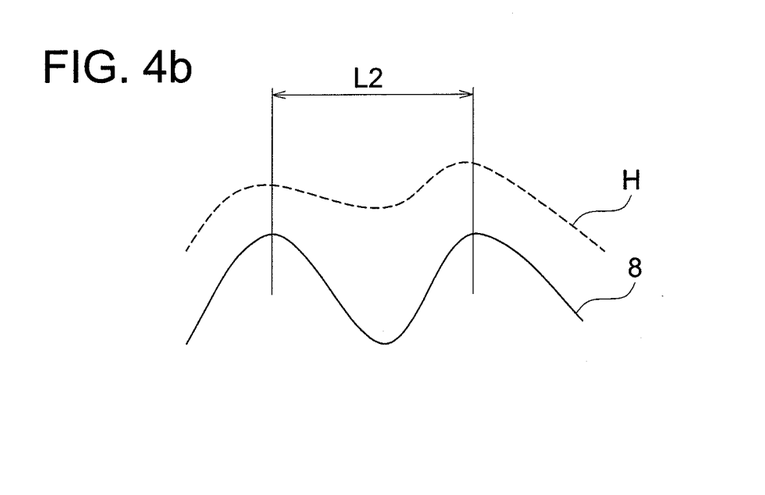

A head can follow the fine undulation having a measurement wavelength L exceeding 120 μm, but in the case of the fine undulation having a measurement wavelength L of less than 80 μm, and it appears that the head can not follow each fine undulation but follow the virtual surface obtained by including the fine undulation having a measurement wavelength L of less than 80 μm as a whole. In FIGS. 4a and 4b, symbol 8 represents a surface profile of a magnetic disk, and symbol H schematically represents movement trajectory of a head. Measurement wavelength L1 of fine undulation in FIG. 4a is a value exceeding 120 μm, and measurement L2 of fine undulation in FIG. 4b is a value less than 80 μm.

It would appear that the range where measurement wavelength L of fine undulation is 80-120 μm is the range close to the lower limit value at which a head can follow each fine undulation.

Since the expression made by root-mean-square leads to averaging when broadening the measurement wavelength, and Rq is to be averaged when targeting undulation of the entire disk surface for the measuring range, it appears that difference between a substrate capable of realizing a low GA value and a substrate not capable of realizing a low GA value is not prominently observed.

In addition, in order to obtain a low GA value, the fine undulation was described above, but it is also desired that the undulation to which the fine undulation is superimposed is small, and an arithmetic mean undulation Wa of less than 0.6 nm is necessary and an arithmetic mean undulation Wa of less than 0.55 nm is preferably necessary.

As to undulation of undulation curve 12 in FIG. 3a, the undulation of the entire glass substrate surface is measured with a multifunctional disk interference meter (OPTIFLAT, manufactured by Phase Shift Technology. Inc.). The measurement principle is with a method by which the surface of a glass substrate is exposed to white light, and intensity change caused by interference generated by reference light and measurement light having different phases to measure delicate shape change of the surface. The undulation is measured from the resulting measured data at a measurement wavelength of 0.1-5 mm, and arithmetic undulation Wa is determined in accordance with JIS B0601:2001.

The fine undulation of fine undulation curve 13 generated on undulation curve 12 in the radial direction in FIG. 3b is measured with an optical surface analyzer OSA (RMS application, manufactured by CANDELA INSTRUMENTS). The measurement is conducted at a measurement wavelength of 80-120 μm to determine root-mean-square Rq in accordance with JIS B0601:2001.

As to the measurement of fine undulation in the radial direction employing an optical surface analyzer OSA, a glass substrate is divided into 125 parts in the circumferential direction so as to result in each angle of 2.88°, and each of the divided parts is measured in each step of 0.89 μm in the radial direction from the inner diameter to the outer diameter to calculate root-mean-square Rq. The glass substrate relating to the present invention has a root-mean-square Rq of less than 0.01 nm in each of those divided into 125 parts in the radial direction, (Manufacturing Steps of Glass Substrate for Information Recording Medium)

Manufacturing steps of a glass substrate for an information recording medium will be described referring to the manufacturing steps in FIG. 5.

There is no limitation to size of a glass substrate to be used. For example, glass substrates each having an outer diameter of 2.5 inches, 1.8 inches, 1 inch, and 0.8 inch can be used. Moreover, there is also no limitation to thickness of a glass substrate, and the glass substrate having a thickness of 2 mm, 1 mm or 0.64 mm can be used.

A glass substrate is melted (glass melting step); a molten glass is cast into a lower die, and pressure molding is conducted with an upper die to obtain a disk-shaped glass substrate precursor (pressure molding step). In addition, a disk-shaped glass substrate precursor may be prepared by cutting a sheet glass formed with a grinding stone employing a down-draw process or a float process, for example, without depending on the pressure molding step.

Usable examples of material used for the glass substrate include soda lime glass composed of $SiO_2$, $Na_2O$, and CaO as principal components, aluminosilicate glass composed of $SiO_2$, $Al_2O_3$, $R_2O$(R=K, Na or Li) as principal components, borosilicate glass, $Li_2O$—$SiO_2$ system glass, $Li_2O$—$Al_2O_3$—$SiO_2$ system glass, and R'O—$Al_2O_3$—$SiO_2$ system glass (R'=Mg, Ca, Sr or Ba). Of these, aluminosilicate glass and borosilicate glass are preferable in view of excellent impact resistance and excellent vibration resistance.

A hole is made in the central part of the glass substrate precursor having been subjected to a pressure molding step employing a core drill equipped with a diamond grindstone on the cutter part of the core drill (coring step).

Next, both main surfaces of a glass substrate are subjected to polishing, and the whole shape of a glass substrate, i.e., parallelism, flatness, and thickness of the glass substrate is preliminarily adjusted (first lapping step).

Then, the outer circumferential edge face and the inner circumferential edge face of the glass substrate are ground employing a grindstone such as a drum-shaped diamond to conduct inner and outer diameter processing (inner and outer diameter processing step).

Next, the inner circumferential edge face of the glass substrate is subjected to brush-grinding employing polishing liquid to make a corner of a chamfered portion to become a curved surface, resulting in removal of fine scratches and so forth (inner circumferential edge face processing step).

Next, both main surfaces of the glass substrate are polished again to finely adjust parallelism, flatness, and thickness of the glass substrate (second lapping step).

Then, the outer circumferential edge face of the glass substrate is subjected to brush-grinding employing polishing liquid to make a corner of a chamfered portion to become a curved surface, resulting in removal of fine scratches and so forth (outer circumferential edge face processing step).

Figure 5:
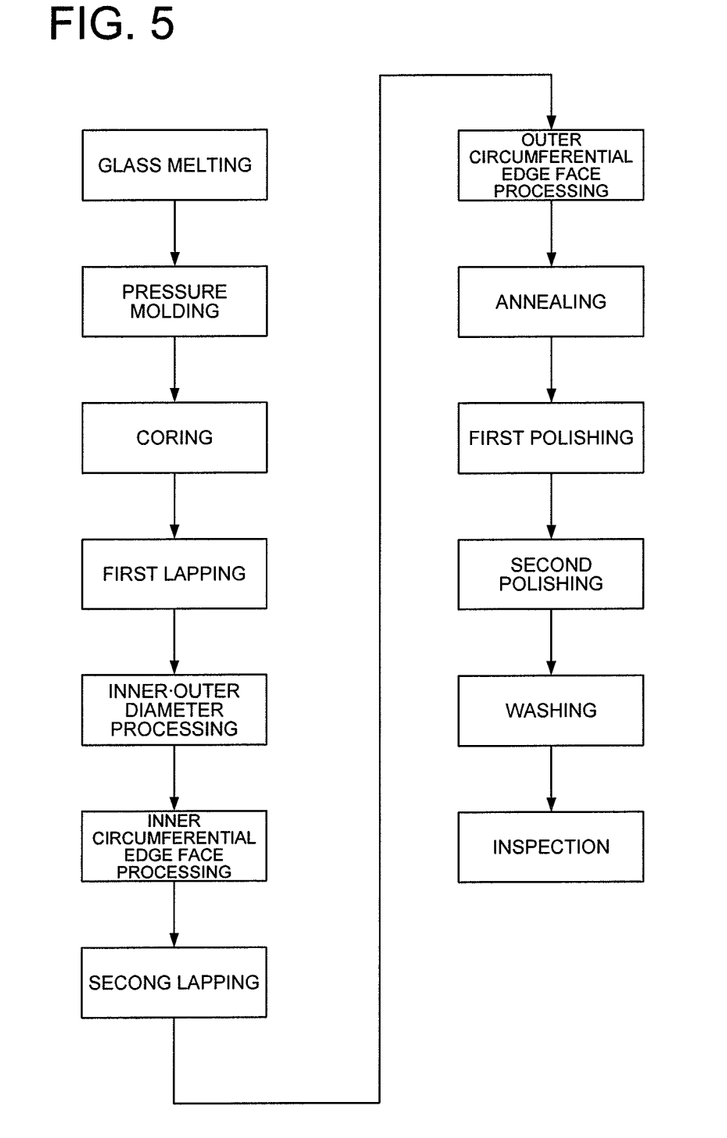
FIG. 5 is a manufacturing step diagram to explain manufacturing steps of a glass substrate for an information recording medium.

Order from the first lapping step to the outer circumferential edge face processing step after the coring step is not limited to those described in FIG. 5, it can be appropriately changed depending on the situation. Only one lapping step is first conducted, and then, the inner and outer diameter processing step, the inner circumferential edge face processing step and the outer circumferential edge face processing step may be conducted. Instead, the second lapping step, the inner circumferential edge face processing step and the outer circumferential edge face processing step may be conducted after conducting the first lapping step and the inner and outer diameter processing step.

A polishing machine to polish a glass substrate in the first and second lapping steps will be described. As a polishing machine, usable is a well-known polishing machine called a double-sided polishing machine. The double-sided polishing machine is equipped with an upper platen and a lower platen in the form of a disk, which are placed parallel to each other, so that they rotate to each other in the reverse direction. There are adhered a plurality of diamond pellets on each of the upper platen and the lower platen facing to each other for polishing the main surface of a glass substrate. A resin sheet in which a diamond grindstone is embedded can be also used in place of diamond pellets. Between the upper platen and the lower platen, there is a plurality of carriers which rotate by combining with internal gears located at the outer circumference of the lower platen in a circle state and a sun gear located in the circumference of the rotary shaft of the lower platen. In this carrier, a plurality of holes are prepared, and a glass substrate is inserted in this hole to place the glass substrate. The upper platen and the lower platen, the internal gear and the sun gear can be operated via a separate driving system.

The polishing operation of a polishing machine is performed as follows. The upper platen and the lower platen rotate to each other in the reverse direction. The carrier inserted into the platen through the diamond pellet orbitally rotates in the same direction as that of a lower platen while axially rotating, in the situation where a plurality of glass substrates are supported. In the polishing machine operated as described above, a glass substrate can be polished by introducing grinding liquid supplied between the upper platen and the glass substrate, and between the lower platen and the glass substrate.

When this double-sided polishing machine is used, a load of the platen loaded to the glass substrate and the number of rotations of the platen are appropriately adjusted according to desired polishing conditions. As to the load in the first and second lapping steps, it is preferable that the load is 600-1200 kg/m². Moreover, the number of rotations of the platen is preferably set to be about 10-30 rpm, and it is preferable to set the number of rotations of the upper platen to be about 30-40% smaller than the number of rotations of the lower platen. When the load from the platen is increased and the number of rotations of the platen is increased, a polishing amount will increase, but the surface roughness will not become satisfactory when the amount of the load is excessive. On the other hand, flatness will not become satisfactory when the number of rotations is too high. Moreover, when the load is small and the number of rotations of the platen is low, there is little polishing quantity, as a result, manufacturing efficiency becomes low.

At a time when finishing the second lapping step, defects such as large undulation, voids and cracks are preferably removed, and surface roughness of the main surface of a glass substrate preferably has an Rz (maximum height) of about 2-4 μm and an Ra (arithmetic mean roughness) of about 0.1-0.4 μm. By having such a surface state, the glass substrate can be efficiently polished in the first polishing step.

In addition, in order to efficiently conduct the second lapping step, large undulation, voids, and cracks are roughly removed in the first lapping step. For this reason, in the first lapping step, it is desirable to use diamond pellets having #800 mesh to #1200 mesh, which are coarser than diamond pellets having #1300 mesh to #2200 mesh to be used in the second lapping step. At a time when completing the first lapping step, it is preferable that surface roughness Rz and Ra are roughly 4-8 µm, and roughly 0.3-0.8 µm, respectively.

The inner and outer circumferential edge faces of a glass substrate are subjected to polishing by brush-grinding in the inner circumferential edge face processing step and the outer circumferential edge face processing step. The brush made of nylon, polypropylene or the like of roughly $\phi 0.2$ mm to $\phi 0.3$ mm is preferably used. Further, polishing liquid is preferably made from cerium oxide having a particle diameter of a few micron meters. Through results obtained via brush-grinding, as to surface roughness of the inner circumferential edge face and surface roughness of the outer circumferential edge face, approximately an Rz of 0.2-0.4 µm and an Ra of 0.02-0.04 µm are preferable. As to shape of the edge face of a glass substrate having been subjected to inner and outer diameter processing step, the inner circumferential edge face processing step and the outer circumferential edge face processing step, droop-down shape appears from the main surface at a position of 0.2-0.5 mm from the outer circumferential edge face since a corner produced by the main surface and the edge face is removed therefrom.

Incidentally, Ra (arithmetic mean roughness) and Rz (maximum height) are defined in accordance with JIS B0601: 2001. These can be measured by an atomic force microscope (AFM) or the like. These definition and measuring method are similarly applied to Ra and Rz described later on.

In the above-described example, diamond pellets and grinding liquid are used when polishing a glass substrate, but a method can be arranged to be a method by which a pad is attached onto the polishing surface of each of upper and lower platens, and polishing liquid to conduct polishing by supplying a polishing agent. Examples of the polishing agent include cerium oxide, zirconium oxide, aluminum oxide, manganese oxide, colloidal silica and diamond. Each of these may be dispersed in water, and used in the form of a slurry. The pad can be separated into a hard pad and a soft pad, but the pad can be chosen suitably to use it, if desired. As a hard pad, a pad made from a material such as a hard velour, a urethane foam, a pitch containing suede, or the like may be employed, and as a soft pad, a pad made from a material such as suede, velour, or the like may be employed.

The polishing step using a pad and a polishing agent can be utilized to conduct rough polishing to precision-polishing by changing the particle size of a polishing agent and a type of pad. This step enables to remove large undulation, voids and cracks in the first lapping step and in the second lapping step so as to obtain the above-described surface roughness by appropriately using the kind of a polishing agent, particle size of the polishing agent and a pad thereof in combination.

Further, it is desirable to conduct a cleaning step to remove a polishing agent and glass powder remaining on the surface of a glass substrate after the first and second lapping steps.

In addition, the polishing machine used in the first lapping step has the same configuration as that in the second lapping step, but it is desirable to perform a polishing operation employing a different polishing machine prepared exclusively for each step. This is because operation for the exchange is large-scaled since diamond pellets are exclusively attached, and complicated operation is involved for readjustment of the polishing conditions, whereby manufacturing efficiency is lowered.

An annealing step is carried out after conducting the outer circumferential edge face step. In the annealing step, a glass substrate is placed in an electric furnace, and a temperature of 200-400° C. is maintained for approximately 10-120 minutes. The temperature-rising rate and the cooling rate are not specifically limited, but temperature may be raised to the predetermined temperature in approximately 10-30 minutes, and be gradually cooled spending approximately 10-60 minutes. Stress-strain generated inside the glass substrate in processing steps having been conducted so far can be released by this annealing step. Further, the annealing step is preferably carried out in oil such as silicone oil or the like, which is difficult to be transubstantiated at an annealing temperature, in inert gas such as argon gas, helium gas or the like, or in nitrogen gas. When annealing is carried out in such an atmosphere, flatness of the gas substance can be maintained since no ionized substance is penetrated into the glass substrate surface.

The subsequent polishing step may be composed of one step, but may be preferably composed of two steps. In the present embodiment, the polishing step is composed of two steps. When conducting a polishing step after the annealing step, stress-strain is released in the inside of glass, whereby no crack is generated in the polishing step, resulting in reduction of an incidence ratio of inferior products.

First, in the first polishing step, not only surface roughness is improved in such a way that the surface roughness to be finally desired in the second polishing step can be efficiently obtained, but also polishing is carried out in such a way that the surface profile of a glass substrate of the present invention can be effectively obtained in the second polishing step.

A polishing machine having the configuration identical to that of a polishing machine employed in the first lapping step and the second lapping step is used, except that in the polishing step, a suede pad and polishing liquid are employed in place of diamond pellets and grinding liquid each having been used in a lapping step.

The pad is a hard pad having a hardness A of about 70-90, and it is preferable to use urethane foam, for example. A hard pad is preferably used since change of the polishing surface becomes large in shape when hardness of the pad becomes soil because of heat generated by polishing. It is preferable to use a polishing material by dispersing cerium oxide having a particle diameter of 0.2-1.5 µm in water to form slurry. The mixing ratio of water to the polishing agent is preferably about 1:9 to 3:7.

A load applied to the glass substrate from a platen can be appropriately adjusted, but it is preferably 900-1100 kg/m$^2$. The load largely affects shape of the outer circumferential edge portion. When the load is increased, the inner side of the outer circumferential edge portion tends to go down, going up toward the outer side. Further, when the load is decreased, the outer circumferential edge portion shows a tendency of increasing a surface roll-off, when the outer circumferential edge portion becomes close to the plane. The load can be determined while observing this tendency.

Further, in order to improve surface roughness, the number of rotations of the platen can be appropriately adjusted, but it is set to 25-50 rpm in view of productivity, and the number of rotations of the upper platen is preferably set to be 30-40% smaller than the number of rotations of the lower platen.

Under the above-described conditions, a polishing amount is preferably set to 30-40 µm. In the case of a polishing amount less than 30 µm, scratches and defects cannot be sufficiently removed. In the case of a polishing amount exceeding 40 µm, polishing proceeds excessively, whereby manufacturing efficiency is lowered.

The second polishing step is a step of further polishing the surface of a glass substrate precisely after completing the first polishing step. The pad used in the second polishing step is a soft pad having a hardness of about 65-80 (Asker-C), which is softer than the pad used in the first polishing step, and urethane foam or suede, for example, is preferably used. As a polishing agent, cerium oxide, colloidal silica or the like may be used similarly to the first polishing step, but in order to further smooth the surface of the glass substrate, a polishing agent having a small particle diameter together with reduced variation in particle size is preferably used. A polishing agent having an average particle diameter of 10-50 nm and preferably about 20 nm is dispersed in water to prepare a slurry, and the resulting slurry is used as polishing liquid.

The polishing liquid preferably has a mixing ratio of 1:9 to approximately 3:7 as a ratio of water:polishing agent, and further, a sulfuric acid and hydrogen peroxide are added therein to be acidized to a pH of lower than 7 and preferably a pH of lower than 2, whereby coagulation of the polishing agent can be avoided, and polishing can be conducted at a particle diameter of proper polishing agent. Thus, the polishing can be more precisely conducted.

In a polishing step, a glass substrate is subjected to application of a load to be processed, similarly to a lapping step. When the glass substrate is subjected to application of a load, undulation of the substrate is to be forcibly relaxed to conduct a polishing step in the state where the substrate is planarized. The undulation of the substrate is further reduced via the polishing step, but the undulation which has been forcibly suppressed reverts back when removing the load from the glass substrate, whereby the undulation becomes larger than before removing load.

Not more than 600 $kg/m^2$ as the applied load lower than a conventional applied load is designed to be set in the second polishing step, and a range of 550-600 $kg/m^2$ is preferable in view of productivity, though no lower limit value is specifically limited. When reducing the applied load at less than 550 $kg/m^2$, the applied load becomes insufficient to polish a glass substrate, and a longer period of time is gradually consumed for polishing, resulting in no practical availability.

When a load of not more than 600 $kg/m^2$ is applied in the second polishing step, forcible relaxation to undulation caused by applied load is reduced, and at this point, polishing is conducted in the state closer to undulation of the glass substrate. For this reason, after conducting a polishing step, a revert-back amount of undulation after removal of applied load becomes small, whereby the undulation and the fine undulation of the glass substrate can be diminished.

Further, not more than 10 rpm is designed to be set as the number of rotations of the platen. When the number of rotations exceeds 10 rpm, vibrations occur in the rotating platen, whereby undulation is to be generated to a glass substrate. When the number of rotations of the platen is 10 rpm or less, vibrations generated to the platen are suppressed, whereby the undulation and the fine undulation of the glass substrate can be diminished. The lower limit is not specifically limited, but when the number of rotations are gradually reduced, a larger period time is consumed for polishing, resulting in no practical availability.

When a load applied to the glass substrate and the number of rotations are designed to be set as described above, an arithmetic mean undulation Wa there of can be set to less than 0.6 nm, and a fine undulation thereof having a root-mean-square height Rq can be set to less than 0.01 nm at a measurement wavelength L of 80-120 µm in the radial direction.

Polishing is preferably conducted by an amount equivalent to 2-5 µm. When the amount falls within this range, not only fine roughness and undulation generated on the surface, but also fine defects such as fine scratches or the like generated in the steps having been carried out so far can be removed therefrom. In addition, in the case of application of only one polishing step, the first polishing step in the present embodiment may be omitted.

After completing the second polishing step, a glass substrate is subjected to washing and inspection to complete the glass substrate for an information recording medium. An oblique perspective view of magnetic disk D as a magnetic recording medium in which a magnetic film is provided on a glass substrate which has been explained so far is shown in FIG. 2. Magnetic disk D is one in which magnetic film 2 is directly formed on each of the surface of circular glass substrate 1 for an information recording medium. Examples of the forming method of magnetic film 2 include a method of forming the magnetic film by spin-coating a thermosetting resin in which magnetic particles are dispersed on a substrate, a method of forming the magnetic film via sputtering, and a method of forming the magnetic film via electroless plating. The layer obtained via spin-coating has a thickness of roughly 0.3-1.2 µm, the layer obtained via sputtering has a thickness of roughly 0.04-0.08 µm, and the layer obtained via electroless plating has a thickness of roughly 0.05-0.1 µm. The film formation carried out via sputtering and electroless plating is preferable in view of thin film formation and high recording density.

Magnetic materials used for magnetic films are not specifically limited, and commonly known ones are usable, but Co exhibiting high magnetocrystalline anisotropy is taken as a base to acquire high coercive force, and the Co system alloy in which Ni and Cr are added is preferable in order to adjust residual magnetic flux density. Examples of the Co system alloy containing Co as a main component include CoPt, CoCr, CoNi, CoNiCr, CoCrTa, CoPtCr, CoNiPt, CoNiCrPt, CoNiCrTa, CoCrPtTa, CoCrPtB, CoCrPtSiO and so forth. A multilayer structure in which magnetic films are sandwiched and isolated by non-magnetic films (Cr, CrMo, CrV and so forth, for example) to make noise reduction may also be utilized. Examples thereof include CoPtCr/CrMo/CoPtCr, CoCrPtTa/CrMo/CoCrPtTa, and so forth. A granular structure in which magnetic particles made of Fe, Co, FeCo, CoNiPt or such are dispersed in a non-magnetic film formed from a ferrite system, an iron-rare earth system, $SiO_2$, BN or such, other than the above-described materials may also be utilized. Further, the magnetic film may also be utilized in any of an in-plane type recording method and a perpendicular type recording method.

A lubricant may be thinly coated on the magnetic film surface in order to improve sliding of a magnetic head. As the lubricant, provided is one in which a liquid lubricant such as perfluoropolyether (PFPE) is diluted with a freon based solvent.

An underlayer and a protective layer may also be provided, if desired. The underlayer provided for a magnetic disk is selected depending on the utilized magnetic film. The underlayer is made of at least one selected from the group consisting of Cr, Mo, Ta, Ti, W, V, B and Al as non-magnetic metals, and Ni. In the case of a magnetic film containing Co as a main component, they are preferably a single piece of Co and a Co alloy in view of improvement of magnetic properties. Further, the underlayer is not always a single layer, and a multilayer structure in which identical layers or non-identical layers are laminated may be allowed to be utilized. Examples of the underlayer having the multilayer structure which may be usable include Cr/Cr, Cr/CrMo, Cr/CrV, NiAl/Cr, NiAl/CrMo, NiAl/CrV and so forth.

Examples of the protective layer to prevent wear and corrosion of magnetic films include a Cr layer, a Cr alloy layer, a carbon layer, a carbon hydride layer a zirconia layer, a silica layer and so forth. These protective layers, together with underlayers, magnetic films and so forth can be continuously formed with an in-line type sputtering apparatus. The protective layer may be a single layer, or a multilayer structure in which identical layers or non-identical layers are laminated may be allowed to be utilized. In addition, a different kind of a protective layer may be formed on the above-described protective layer, or the above-described protective layer may be replaced by a different kind of a protective layer. For example, in place of the above-described protective layer, a silicon dioxide ($SiO_2$) layer may be formed by coating one, in which colloidal silica particles are dispersed in what tetraalkoxy silane is diluted with an alcohol based solvent, on a Cr layer, and further by baking it.

Glass substrates for the information recording medium relating to the present invention are not limited to a magnetic recording medium (magnetic disk), and also usable for magneto-optical disks, optical disks and so forth.

EXAMPLE

Glass substrates and magnetic disks were prepared as described below.
(Preparation of Glass Substrate)
Molten glass was subjected to pressure-molding to prepare a blank material employing aluminosilicate glass (Tg: 500° C.) as a glass material. A glass substrate having an outer diameter of 65 mm and an inner diameter of 20 mm was prepared via the inner and outer circumferential processing steps and the lapping steps.
(Annealing Step)
An electrically-heated furnace is used in air atmosphere in the annealing step, and 100 glass substrates for each example were prepared at an annealing temperature of 350° C. for an annealing duration of 10 minutes. The temperature-rising time from ordinary temperature was set to 30 minutes, and the cooling time to the ordinary temperature was set to one hour.
(Polishing Step)
In the first lapping step, a urethane pad manufactured by Nitta Haas Inc. was employed, and cerium oxide was used as a polishing agent.
In the second polishing step, a suede pad manufactured by FILWEL Co., Ltd. was used, and cerium oxide or colloidal silica was used as a polishing agent.
In the polishing condition of the second polishing step, the pad has a hardness of 80 (Asker-C); the polishing agent has a particle diameter of roughly 20-30 nm; the polishing liquid is set to a pH of 2 via addition of hydrogen peroxide; and the conditions of the number of rotations of the upper and lower platens (rpm), and applied load ($kg/m^2$) are shown in Table 1.
(Washing Step)
In the washing step, brush-washing was conducted with a roll scrub machine or a cup scrub machine, and washing was subsequently carried out with an ultrasonic washing machine.
(Measurement of Undulation Height and Fine Undulation)
Undulation of the surface of the resulting glass substrate was measured to determine arithmetic mean undulation Wa, employing Opti Flat (manufactured by Phase Shift Technology Inc., and a measurement wavelength of 0.1-5 mm).
Height of the fine undulation is measured at a measurement wavelength L of 80-120 μm employing an optical surface analyzer OSA (manufactured by CANDELA INSTRUMENTS; RMS application) to determine a root-mean-square height Rq thereof. The results are shown in Table 1.

(Preparation of Magnetic Disk)
CoPt magnetic particles were sputtered on the surface of the resulting glass substrate to form a 0.05 μm thick magnetic film. Thus, a magnetic disk was prepared.
(Measurement of GA Value)
The magnetic disk is installed in a specialized device for measuring GA values as an inspection disk and rotated at constant speed to float a head above the disk. In this situation, the space in which the head was floated above the inspection disk was depressurized while measuring signals from the head, and air pressure was obtained at a time when the signals from the head became unstable to determine GA values from this air pressure.
A GA value of less than 3 nm was practically desired, and evaluation results in Table 1 were shown with symbols of A, B and C in accordance with the following criteria.
A: Less than 2 nm
B: Not less than 2 nm and less than 3 nm
C: Not less than 3 nm

TABLE 1

| | Applied load ($kg/m^2$) | The number of rotations | Wa (nm) | Rq (nm) | GA (nm) | Evaluation result |
|---|---|---|---|---|---|---|
| Example 1 | 600 | 10 | 0.47 | 0.009 | 2.3 | B |
| Example 2 | 580 | 8 | 0.52 | 0.006 | 1.9 | A |
| Example 3 | 580 | 10 | 0.56 | 0.008 | 2.7 | B |
| Example 4 | 600 | 8 | 0.28 | 0.008 | 2.8 | B |
| Comparative example 1 | 600 | 15 | 0.045 | 0.031 | 4.2 | C |
| Comparative Example 2 | 650 | 8 | 0.072 | 0.021 | 3.3 | C |
| Comparative Example 3 | 650 | 10 | 0.53 | 0.015 | 4.5 | C |
| Comparative Example 4 | 700 | 10 | 0.68 | 0.032 | 4.8 | C |

As is clear from Table 1, magnetic disks each having an arithmetic mean undulation Wa of less than 0.6 nm, and a fine undulation having a root-mean-square height Rq of less than 0.01 nm in the radial direction have a GA value of less than 3 nm, leading to excellent results.

EXPLANATION OF NUMERALS

1 Glass substrate for information recording medium (glass substrate)
2 Magnetic film
5 Hole
7a Front main surface
7b Back main surface
10t Outer circumferential edge face
11 Measured cross-sectional curve
12 Undulation curve
13 Fine undulation curve
20t Inner circumferential edge face
D Magnetic disk

The invention claimed is:
1. A glass substrate for an information recording medium, wherein a surface of the glass substrate has an arithmetic mean undulation Wa that is less than 0.55 nm at a measurement wavelength of 0.1-5 mm, and a fine undulation has a root-mean-square height Rq of less than 0.007 nm at a measurement wavelength of 80-120 μm in a radial direction.
2. An information recording medium comprising:
a glass substrate for an information recording medium, wherein a surface of the glass substrate has an arithmetic mean undulation Wa that is less than 0.55 nm at a mea- surement wavelength of 0.1-5 mm, and a fine undulation has a root-mean-square height Rq of less than 0.007 nm at a measurement wavelength of 80-120 μm in a radial direction; and a magnetic film provided on the glass substrate.

3. A method of manufacturing a glass substrate for an information recording medium, comprising :

polishing at not more than 600 kg/m$^2$ as a load applied to the glass substrate from a platen of a polishing machine and at not more than 10 rpm as the number of rotations of the platen, wherein an entire surface of the glass substrate after the foregoing polishing has, throughout an entire radial direction of the glass substrate, an arithmetic mean undulation Wa in the radial direction of less than 0.6 nm at a measurement wavelength of 0.1-5 mm, and, throughout the entire radial direction, a fine undulation in the radial direction having a root-mean-square height Rq of less than 0.01 nm at a measurement wavelength of 80-120 μm, wherein the arithmetic mean undulation Wa is less than 0.55 nm, and the fine undulation has a root-mean-square height Rq of less than 0.007 nm.

\* \* \* \* \*